United States Patent [19]

Yamamoto et al.

[11] Patent Number: 4,874,818

[45] Date of Patent: Oct. 17, 1989

[54] PRIMER COMPOSITIONS

[75] Inventors: Shosaku Yamamoto; Kazuo Kakinuma; Hiroshi Ishioka, all of Yokohama; Fumio Sodeyama, Chigasaki; Junji Mayumi, Tsu City; Riichiro Maruta, Yokkaichi, all of Japan

[73] Assignee: Nippon Oil and Fats Co., Ltd., Tokyo, Japan

[21] Appl. No.: 78,854

[22] Filed: Jul. 28, 1987

[30] Foreign Application Priority Data

Aug. 21, 1986 [JP] Japan ................................. 61-194076

[51] Int. Cl.$^4$ ....................... C08L 31/02; C08L 35/06
[52] U.S. Cl. ...................................... 525/183; 525/93; 525/186

[58] Field of Search ................... 525/186, 183, 92, 93

[56] References Cited

FOREIGN PATENT DOCUMENTS 0169037  1/1986  European Pat. Off. ............ 525/186

Primary Examiner—Jacob Ziegler
Attorney, Agent, or Firm—Arnold, White & Durkee

[57] ABSTRACT

A primer composition usable for steel sheet and plastic sheet in vehicle bodies consists mainly of a polycaprolactone graft polymer obtained by graft-polymerizing a styrene-butadiene-styrene block copolymer or its hydrogenated polymer with a ring-opened polymer of ε-caprolactone and having a grafting ratio of the ring-opened polymer within a range of 0.5~50% by weight.

2 Claims, No Drawings

PRIMER COMPOSITIONS

BACKGROUND OF THE INVENTION

1. Field of the Invention

This invention relates to a primer composition adaptable for both steel sheet and plastic sheet as vehicle bodies.

2. Related Art Statement

In the painting of steel sheets and plastic sheets for vehicle bodies, there has hitherto been adopted a method wherein the painting is performed on every sheet and then the painted sheets are assembled at a final step.

The steel sheet is degreased and phosphated to form a phosphate layer thereon. After an under coat is formed by electrodeposition, a chipping primer or a stoneguard coat is partially applied and then an inter coat and a top coat are formed thereon.

In the formation of the inter coat, a chipping-resistant and corrosion-resistant inter coating consisting of a film forming resin composed mainly of an acidic resin having an acid value of 10~50, talc powder and rust-preventive pigment is applied in order to prevent the rusting and the promotion of corrosion even if the metal substrate is partially exposed by chipping, which is disclosed in Japanese Patent laid open No. 55-56,165.

On the other hand, the plastic sheet is degreased, dried and coated with an exclusive primer for the plastic sheet. Then, an exclusive inter coat and an exclusive top coat are successively formed thereon. In this case, the formation of the exclusive inter coat may be omitted.

As the exclusive primer, Japanese Patent Application Publication No. 51-36,285 discloses a primer composed of a reaction product between ungelled hydroxy-containing urethane reactant and polycarboxylic acid or its anhydride and an aminoplast resin for polyurethane resin used as a sheet material in automobile bumpers or molded articles.

Further, Japanese Patent laid open No. 59-30,830 discloses a primer consisting mainly of chlorinated polypropylene for polypropylene resin used as a sheet material in the automobile bumper.

Assuming that polyamide resin, polybutylene terephthalate resin, polycarbonate resin or the like is used as a top coat forming a hard painted coating on the steel sheet for the vehicle body, a primer composition for plastic parts comprising a resin obtained by grafting propylene-ethylene copolymer with maleic acid or maleic anhydride and a conductive substance is used as disclosed in Japanese Patent laid open No. 61-76,557.

Thereafter, the painted plastic sheet is assembled onto the painted steel sheet, which is transferred to subsequent steps.

As the other painting method, there is a method wherein the plastic sheet is degreased, dried, coated with the above exclusive primer, baked and then assembled onto the steel sheet previously degreased, phosphated and coated with an under coat, and thereafter the common inter coat and top coat are formed and baked on the assembly of the plastic sheet and steel sheet.

According to these conventional painting methods, however, the structure of the resulting paint coats is different between the plastic sheet and the steel sheet, and the paint used and the painting step are also different, so that the following problems exit.

(1) Since the painting equipment must be separately arranged for the painting of steel sheet and for the painting of plastic sheet, not only the operation efficiency is poor but also an huge equipment investment is required;

(2) Differences in appearance such as color tone, gloss and the like are caused between the plastic sheet and the steel sheet which degrade the commercial value of the automobile as a whole;

(3) Differences in the durability of painted coatings are caused between the plastic sheet and the steel sheet to injure the beautiful appearance of the automobile from a long-term viewpoint and; (4) When the plastic sheet is coated with the exclusive primer, assembled into the steel sheet and then the resulting assembly is subjected to painting, there are caused no problems as described in the above items (1)–(3). In the selection of paints for inter coat and top coat, however, there are problems such that when a soft coating is used in conjunction with the plastic sheet, the weather resistance, polishing property, solvent resistance, stain resistance and the like are degraded, while when a hard coating is used in conjunction with the steel sheet, the impact resistance, chipping resistance and the like of the plastic sheet are degraded. Further, it has been attempted to examine various top coats suitable for both plastic sheet and steel sheet. However, there is still a problem that the performances such as polishing property, stain resistance and so on are not consistent with the performances for plastic sheet such as impact resistance, chipping resistance and so on.

SUMMARY OF THE INVENTION

Under the above circumstances, the inventors have made various studies and found that a primer composition consisting mainly of a polycaprolactone graft polymer having a primary hydroxyl group, which is obtained by graft-polymerizing a styrene-butadiene-styrene block copolymer or its hydrogenated polymer (component A) with a ring-opened polymer of $\epsilon$-caprolactone (component B), is applied onto the under coat formed by electrodeposition in case of the steel sheet and as a primer for plastic in case of the plastic sheet, whereby the simultaneous painting for inter coat and top coat as a hard coating used for steel sheet is possible and the aforementioned problems can be solved.

That is, the invention provides a primer composition consisting mainly of a polycaprolactone graft polymer having a primary hydroxyl group, which is obtained by graft-polymerizing a styrene-butadiene-styrene block copolymer or its hydrogenated polymer (component A) with a ring-opened polymer of $\epsilon$-caprolactone (component B) and has a grafting ratio of the ring-opened polymer of $\epsilon$-caprolactone within a range of 0.5~50% by weight.

DESCRIPTION OF THE PREFERRED EMBODIMENTS

The polycaprolactone graft polymer as a main component in the primer composition according to the invention is obtained by graft polymerization of the component A with the component B as mentioned later.

At first, the production method of styrene-butadiene-styrene block copolymer used in the formation of the resin of component A according to the invention is well-known in the art, a typical example of which is disclosed in U.S. Pat. No. 3,265,765. In general, this method includes solution polymerization of a mixture of aromatic monovinyl hydrocarbon monomer and conjugated diene monomer in the presence of a catalyst having the general formula of R(Li)x, wherein x is an integer of 1~4 and R is a hydrocarbon residue selected from aliphatic, alicyclic and aromatic residues.

Further, the intermolecular double bonds of the styrene-butadiene-styrene block copolymer may be subjected to hydrogenation. The production of such a hydrogenated polymer is disclosed, for example, in Japanese Patent Application Publication Nos. 42-8,704, 43-6,636, 45-20,504, 48-3,555 and the like.

There will be described a method of graft-polymerizing the styrene-butadiene-styrene block copolymer or its hydrogenated polymer of component A with a ring-opened polymer of ε-caprolactone forming a resin of component B.

In a first method, ε-caprolactone is subjected to ring opening polymerization with a low molecular weight hydroxyl group-containing acrylic or methacrylic ester (hereinafter referred to as an hydroxyl group-containing monomer) to form α,β-unsaturated group containing polycaprolactone (hereinafter referred to as PCL monomer), which is directly subjected to graft polymerization to form a polycaprolactone graft polymer.

In a second method, a hydroxyl group-containing monomer is graft-polymerized at a first stage and then subjected to ring opening polymerization with ε-caprolactone at a second stage to form a polycaprolactone graft polymer.

In a third method, a polycaprolactone graft polymer is obtained by simultaneously performing the first stage graft polymerization of the hydroxyl group-containing polymer and the second stage ring opening polymerization of ε-caprolactone as described in the above second method.

As the hydroxyl group-containing monomer, mention may be made of hydroxyalkyl esters of acrylic or methacrylic acid such as 2-hydroxymethyl ester of acrylic or methacrylic acid, 2-hydroxyethyl ester of acrylic or methacrylic acid, 2-hydroxypropyl ester of acrylic or methacrylic acid, 2-hydroxybutyl ester of acrylic or methacrylic acid and so on.

The PCL monomer is α,β-unsaturated group containing monomer obtained by subjecting the above hydroxyl group-containing monomer to ring opening polymerization with ε-caprolactone.

For the graft polymerization of the PCL monomer or hydroxyl group-containing monomer with styrene-butadiene-styrene block copolymer or its hydrogenated polymer, there are a method wherein radical polymerization is performed by melting and kneading the mixture through an extruder, and a method wherein the block copolymer is dispersed in an aromatic hydrocarbon solvent such as toluene, xylene, benzene or the like containing a radical polymerization initiator and added with PCL monomer or hydroxyl group-containing monomer and then heated to perform radical polymerization, and the like.

As the radical polymerization initiator, use may be made of any radical initiators usually used, typical examples of which include organic peroxides, azonitriles and so on. As the organic peroxide, mention may be made of alkyl peroxide, aryl peroxide, acyl peroxide, aroyl peroxide, ketone peroxide, peroxy carbonate, peroxy carboxylate and the like. The alkyl peroxide includes diisopropyl peroxide, di-tert-butyl peroxide, tert-butyl hydroperoxide and so on. The aryl peroxide includes dicumyl peroxide, cumyl hydroperoxide, and so on. The acyl peroxide includes dilauroyl peroxide and so on. The aroyl peroxide includes dibenzoyl peroxide and so on. The ketone peroxide includes methylethylketone peroxide, cyclohexanone peroxide and so on. As the azonitrile, mention may be made of azobisisobutyronitrile, azobisisopropionitrile and the like.

As the ring opening polymerization of ε-caprolactone is used a well-known method as disclosed in Japanese Patent laid open No. 54-133,590.

That is, ε-caprolactone and a catalyst for ring opening polymerization such as tetrabutyl titanate, dibutyltin dilaurate or the like are supplied to a hydroxyl group-containing resin solution and then the reaction system is maintained at a temperature of 140°~150° C. to polymerize ε-caprolactone to the hydroxyl group of the resin through ring opening.

The grafting ratio of component B the ring opened polymer of ε-caprolactone, is 0.5~50% by weight. When the grafting ratio is less than 0.5% by weight, the grafting effect through ring opening of ε-caprolactone is insufficient, and the impact resistance at low temperature (−30°) for plastic sheet, as well as the chipping resistance of steel sheet are poor, while when it exceeds 50% by weight, the adhesion property for steel and plastic sheets is low and the humidity resistance is poor.

In the polycaprolactone graft polymer composed the component A and the component B, the ratio of component B/components A+B is within a range of 0.005~0.5.

The primer composition according to the invention may contain not more than 30% by weight as solid content of the other resin and crosslinking agent in addition to the polycaprolactone graft polymer composed of components A and B. When the amount of these additives exceeds 30% by weight, the impact resistance at low temperature and the chipping resistance lower. As the other resin, mention may be made of acrylic resin, polyester resin, epoxy resin, alkyd resin, chlorinated and/or maleated polyolefin resin and so on. The crosslinking agent includes (1) self-reaction type compounds, (2) polyisocyanate compounds and so on. As the self-reaction type compound (1), mention may be made of amino resins such as melamine resin and urea resin modified with an alcohol such as methanol, ethanol, n-butanol, isobutanol or the like; and acrylic resins obtained by copolymerizing a polymerizable unsaturated group containing compound (e.g. polyfunctional acrylates such as trimethylolpropane triacrylate, polyethylene glycol diacrylate, penthaerythritol triacrylate and so on; epoxy compounds esterified with acrylic or methacrylic acid; polyurethane acrylate or methacrylate obtained by reacting a polyisocyanate compound as mentioned below with acrylic or methacrylic acid; melamine acrylate or methacrylate obtained by reacting the above mentioned melamine resin with acrylic or methacrylic acid; and the like) with an acryl monomer having a functional group such as carboxyl group, hydroxyl group, amino group, methylol group or the like.

As the polyisocyanate compound (2), mention may be made of aromatic and aliphatic diisocyanates such as tolylene diisocyanate, 4,4'-diphenylmethane diisocyanate, isophorone diisocyanate, 1,6-hexamethylene diisocyanate, cyclohexane-1,4-diisocyanate and so on; addition products of the aromatic and aliphatic diisocyanate with diol, triol or the like; polyisocyanates such as chain trimers bonded through biuret reaction, cyclic trimers and so on; and blocked isocyanate compounds obtained by hindering a whole or a part of isocyanate groups contained in the aforementioned polyisocyanate compound with a blocking agent such as lower alcohol, ε-caprolactone, methylethylketoxime, diethyl malonate, phenol or the like.

These crosslinking agents are used alone or in admixture.

Furthermore, the crosslinking agent may be used together with a resin having an active hydrogen-containing functional group such as carboxyl group, hydroxyl group, amino group, imino group or the like, e.g. acrylic resin, polyester resin, polyurethane resin and so on, or an epoxy compound having at least one epoxy group, preferably two or more epoxy groups in the molecule.

The primer composition according to the invention may contain a pigment. As the pigment, mention may be made of inorganic and organic pigments usually used in the paint, such as titanium dioxide, carbon black, talc, kaolin, calcium carbonate, magnesium carbonate, barium sulfate, iron oxide, cyanine blue, quinacridone red and so on. In order to form the inter coat and top coat by electrostatic painting, it is favorable that the resulting coating has an electric conductivity. In this case, a conductive pigment, particularly conductive carbon black can be used, wherein the surface resistivity is usually suitably to not more than $10^{10}$ Ω.cm.

In the primer composition according to the invention, it is desirable that the ratio of pigment to solid resin content (P/B) is 0~2.0. When this ratio exceeds 2.0, the flexibility of the coating is poor, and the chipping resistance on the steel sheet and the chipping resistance and impact resistance on the plastic sheet are poor.

The usable organic solvent is enough to uniformly dissolve the resins and stably store them for a long-time period, and includes organic solvents for usual paints, e.g. aliphatic hydrocarbon solvents such as mineral spirit, n-hexane and so on; aromatic hydrocarbon solvents such as toluene, xylene and so on; ester series solvents such as ethyl acetate, butyl acetate and so on; ketone series solvents such as methyl ethyl ketone, methyl isobutyl ketone and so on.

In this case, the primer composition comprises 50~98% by weight of the organic solvent.

If necessary, the primer composition according to the invention may be compounded with additives for paint such as a surface regulating agent, antisettle agent, heat degradation preventing agent, light degradation preventing agent, pigment dispersing agent and the like as well as a reaction catalyst promoting the reaction.

The primer composition according to the invention may be produced by the usual paint manufacturing process or pigment dispersing process. When the primer composition does not contain a pigment, it can be produced by mixing the resins with, if necessary, additives for paint and organic solvent in a well-known agitating device such as a dissolver to form a uniform resin solution. On the other hand, when the primer composition contains a pigment, it can be produced by dispersing the pigment into a part or whole of the resin in a well-known pigment dispersing machine such as an attritor, sand mill or the like and then adding the remaining resin, organic solvent and additives for paint thereto to adjust the viscosity to a given value.

As a means for applying the primer composition according to the invention, use may be made of well-known painting processes such as air spraying, electrostatic air spraying, electrostatic spray painting and the like.

The primer composition according to the invention is simultaneously applicable to the steel sheet for a vehicle body after the painting of under coat and the plastic sheet after the degreasing and drying. After the application of the primer composition, the primer coating is left to stand at room temperature for 1~10 minutes, or the forced drying is carried out at 80° C. for about 30 minutes. Then, the inter coat and top coat usually used can be formed thereon.

Even when the primer composition is applied to both the steel sheet and plastic sheet, the painting of the inter coat can be omitted, if necessary. As a paint for the inter coat and top coat, there may be used paints usually used on the steel sheet for the vehicle body and the plastic sheet.

As the plastic material applicable to the primer composition according to the invention, mention may be made of ones used as a plastic for the vehicle body, such as polyamide resin, polybutylene terephthalate resin, polyurethane resin, polycarbonate resin, unsaturated polyester resin, polyphenylene oxide resin, polypropylene resin, a mixture thereof, a reinforced resin thereof and the like. However, the invention is not restricted to these resins as a plastic material.

Although the primer composition according to the invention has been described with respect to the painting of the vehicle body, it is a matter of course that such a primer composition is applicable to simultaneous painting on a combination of steel sheet and plastic sheet as another product or a single painting on the steel sheet and plastic sheet.

As mentioned above, the primer composition according to the invention can simultaneously be applied to the steel sheet for a vehicle body and the plastic sheet for a vehicle body owing to the presence of the polycaprolactone graft polymer composed of the components A and B at a particular weight ratio as a main component so that it is possible to simultaneously conduct the painting of the same hard inter coat and hard top coat on both the sheets in the same painting equipment and to effect the baking in the same baking furnace. Therefore, the uniformity of qualities in the painted coats on both the sheets, for example, appearance qualities such as color tone, gloss and the like and durability qualities such as weather resistance, chemical resistance and the like can be made complete.

Further, when the primer composition according to the invention is applied to the undercoated steel sheet, the chipping resistance, adhesion property, humidity resistance, heating-cooling cycle property, gasoline resistance and the like are improved, while when it is applied to various plastic sheets for a vehicle body, the chipping resistance, adhesion property, humidity resistance, heating-cooling cycle property, gasoline resistance, impact resistance and the like are improved.

The following examples are given in illustration of the invention and are not intended as limitations thereof. In the examples, all percentages are by weight, unless otherwise stated.

PRODUCTION OF RESIN VARNISH:

Resin varnish I

Into a stainless pressure vessel provided with a thermometer and a stirrer were charged 1l of xylene and 100 g of hydrogenated styrene-butadiene-styrene block copolymer (Kraton G-1652, trade name, made by Shell Chemical Corp., solid content: 100%) and the interior of the vessel was purged with a nitrogen gas. After the temperature was raised to 110° C, a 10% solution of Plaksel FA-4 as PCL monomer (trade name, made by Daicel Chemical Industries, ester obtained by polymerizing 1 mol of 2-hydroxyethyl ester of acrylic acid with 4 mol of ε-caprolactone) in xylene and a 15% solution of dicumyl peroxide in xylene were supplied from separate conduits over 12 hours to add 42.9 g of PCL monomer and 3 g of dicumyl peroxide to the reaction mixture. After the stirring was continued at 110° C. for 3 hours to complete the reaction, the reaction product was cooled to about room temperature and mixed with acetone for filtration. After the washing with acetone repeatedly, the precipitates were dried under a reduced pressure while temperature was increased to obtain a white powdery polycaprolactone graft polymer having a solid content of 100%. As a result of infrared absorption spectrophotometry on the resin, the ring-opened polymer of ε-caprolactone was grafted in an amount of 1.7%. The resulting polycaprolactone graft polymer was dissolved in a mixed solvent of xylene and methyl ethyl ketone with a mixing ratio of 90:10 by warming to obtain

Resin varnish II

To a hydrogenated styrene-butadiene-styrene block copolymer, Kraton G-1650 (trade name, made by Shell Chemical Corp., solid content: 100%) was added 100 g of 2-hydroxyethyl ester of methacrylic acid, and then the graft polymerization was effected in the same manner as in the resin varnish I to obtain a powdery graft resin of 2-hydroxyethyl ester of methacrylic acid having a grafting ratio of 3.4% by weight.

The resulting resin was dissolved in xylene by warming to obtain a 20% resin solution. 1,000 g of the resulting resin solution was charged into a flask of 2l capacity and heated to 145° C., to which were added 86 g of ε-caprolactone and 1 g of a 10% solution of tetrabutyl titanate in xylene. The resulting mixture was reacted at 145° C. for 24 hours to obtain a solution of polycaprolactone graft polymer. The grafting ratio of the ring-opened polymer of ε-caprolactone was 30.2%. After the completion of the reaction, the reaction product was cooled to about room temperature and added with a proper amount of a mixed solvent of xylene and methyl ethyl ketone with a mixing ratio of 90:10 to obtain a resin varnish H having a solid content of 20%.

Resin varnish III

Into the same apparatus as in the synthesis of the resin varnish I were charged 1l of xylene and 100 g of the hydrogenated styrene-butadiene-styrene block copolymer, Kraton G-1650, and after the temperature was raised to 110° C., 15 g of 2-hydroxyethyl ester of methacrylic acid and 3 g of dicumyl peroxide were supplied as a 15% xylene solution from separate conduits over 12 hours, and then the stirring was continued at 110° C. for 3 hours. Thereafter, a solution of 1 g of tetrabutyl titanate in 10 g of xylene was added, and the temperature was raised to 145° C., and then the stirring was continued for 24 hours. After the completion of the reaction, the reaction product was cooled to about room temperature and added with acetone to form precipitates, which were filtered, repeatedly washed with acetone and dried under a reduced pressure while temperature was increased to obtain a white powder of polycaprolactone graft polymer having a solid content of 100%. The grafting ratio of the ring-opened polymer of ε-caprolactone was 9.6%. The resulting polymer was dissolved in a mixed solvent of xylene and methyl ethyl ketone with a mixing ratio of 90:10 to obtain a resin varnish III having a solid content of 20%.

Resin varnish IV

The same procedure as in the resin varnish II was repeated, except that Kraton G-1652 was used as a hydrogenated styrene-butadiene-styrene block copolymer and the amount of ε-caprolactone added was 120 g, to obtain a resin varnish IV having a solid content of 20%. In this case, the grafting ratio of the ring-opened polymer of ε-caprolactone was 45.2%.

Resin varnish V

The same procedure as in the resin varnish I was repeated, except that the amount of Plaksel FA-4 as PCL monomer was 2.3 g, to obtain a resin varnish V having a solid content of 20%. In this case, the grafting ratio of the ring-opened polymer of ε-caprolactone was 0.08%.

Resin varnish VI

The same procedure as in the resin varnish II was repeated, except that the amount of ε-caprolactone added was 283 g, to obtain a resin varnish VI having a solid content of 20%. In this case, the grafting ratio of the ring-opened polymer of ε-caprolactone was 60.9%.

PRODUCTION OF PRIMER:

Examples 1~4, Comparative Examples 1 and 3

As shown in the following Table 1, the resin varnish was diluted with toluene to adjust a spraying viscosity to 12 seconds (20° C.) as Ford cup No. 4.

Examples 5~7, Comparative Examples 4 and 5

The components giving a compounding recipe shown in Table 1 were thoroughly stirred in a dissolver to obtain a uniform resin solution, which was diluted with toluene to adjust a spraying viscosity to 12 seconds (20° C.) as Ford cup No. 4.

Examples 8~9, Comparative Example 2

The components giving a compounding recipe shown in Table 1 were uniformly stirred in a dissolver, which was charged into an attritor and then kneaded for 8 hours. The resulting mixture was diluted with toluene to adjust a spraying viscosity to 12 seconds (20° C.) as Ford cup No. 4.

The details of components shown in Table 1 are as follows.
Blocked isocyanate compound:
  Coronate DC-2725 (trade name, made by Nippon Polyurethane Industry Co., Ltd., solid content: 80%)
n-Butyrated melamine resin:
  Yuban 22R-60 (trade name, made by Mitsui Toatsu Chemicals, Inc., solid content: 60%)
Malenated polyolefin resin:
  Yunistol P-401 (trade name, made by Mitsui Toatsu Chemicals, Inc., solid content: 8%)
Acrylic resin:
  Acrylic 49-394-1M (trade name, made by Dainippon Ink and Chemicals, Inc., solid content: 50%)
Titanium dioxide:

Taipake R-830 (trade name, made by Ishihara Sangyo K.K.)
Carbon black:
   Mitsubishi Carbon MA-11 (trade name, made by Mitsubishi Chemicals, Inc.)
Conductive carbon black:
   Conductex No. 975 (trade name, made by Columbian Carbon, Japan)
Talc:
   Talc LMR-100 (trade name, made by Fuji Talc K.K.)

PAINTING OF PLASTIC SHEET:
1. Plastic sheet
   (A) Polyamide resin sheet (PA) 1013 RW-1 (trade name, made by Ube Industries, Ltd.)
   (B) Polybutylene terephthalate resin sheet (PBT) 5201XII (trade name, made by Toray Industries, Inc.)
   (C) Unsaturated polyester resin sheet (SMC) N12 (trade name, made by Takeda Chemical Industries, Ltd.)
   (D) Mixed resin sheet of polyamide resin (PA) and

TABLE 1

|  |  | Example |  |  |  |  |  |  |  |  | Comparative Example |  |  |  |  |
|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 |
| Polycaprolactone graft polymer | Resin varnish I (20%)* | 100.0 |  |  |  | 97.6 | 94.6 | 61.5 | 65.1 | 62.5 |  | 52.6 |  | 82.4 | 86.0 |
|  | Resin varnish II (20%)* |  | 100.0 |  |  |  |  |  |  |  |  |  |  |  |  |
|  | Resin varnish III (20%)* |  |  | 100.0 |  |  |  |  |  |  |  |  |  |  |  |
|  | Resin varnish IV (20%)* |  |  |  | 100.0 |  |  |  |  |  |  |  |  |  |  |
|  | Resin varnish V (20%)* |  |  |  |  |  |  |  |  |  | 100.0 |  |  |  |  |
|  | Resin varnish VI (20%)* |  |  |  |  |  |  |  |  |  |  |  | 100.0 |  |  |
| Crosslinking agent | blocked isocyanate compound (80%)* |  |  |  |  | 2.4 |  |  | 1.6 |  |  |  |  |  | 14.0 |
|  | n-butyrated melamine resin (60%)* |  |  |  |  |  | 0.9 |  |  |  |  |  |  | 3.1 |  |
| Resin | malenated polyolefin resin (8%)* |  |  |  |  |  |  | 38.5 |  |  |  |  |  |  |  |
|  | acrylic resin (50%)* |  |  |  |  |  | 4.5 |  |  |  |  |  |  | 14.5 |  |
| Pigment | titanium dioxide |  |  |  |  |  |  |  | 4.6 |  |  | 18.4 |  |  |  |
|  | carbon black |  |  |  |  |  |  |  | 0.1 |  |  | 0.1 |  |  |  |
|  | conductive carbon black |  |  |  |  |  |  |  |  | 3.1 |  |  |  |  |  |
|  | talc |  |  |  |  |  |  |  | 2.5 | 3.1 |  | 7.8 |  |  |  |
| Solvent | xylene |  |  |  |  |  |  |  | 23.5 | 28.2 |  | 19.0 |  |  |  |
|  | methyl ethyl ketone |  |  |  |  |  |  |  | 2.6 | 3.1 |  | 2.1 |  |  |  |
|  | Total | 100.0 | 100.0 | 100.0 | 100.0 | 100.0 | 100.0 | 100.0 | 100.0 | 100.0 | 100.0 | 100.0 | 100.0 | 100.0 | 100.0 |
| Characteristic values | content of resin or crosslinking agent (solid resin content)** | 0 | 0 | 0 | 0 | 9 | 13 | 20 | 9 | 0 | 0 | 0 | 0 | 35.5 | 40.0 |
|  | P/B | 0 | 0 | 0 | 0 | 0 | 0 | 0 | 0.5 | 0.5 | 0 | 2.5 | 0 | 0 | 0 |
|  | grafting ratio of ε-caprolactone ring-opened polymer (%) | 1.7 | 30.2 | 9.6 | 45.2 | 1.7 | 1.7 | 1.7 | 1.7 | 1.7 | 0.08 | 1.7 | 60.9 | 1.7 | 1.7 |

Note:
*Numerical value in parenthesis shows a solid resin content.
**content (%) of resin or crosslinking agent in primer (solid content: 100%)

PAINTING OF STEEL SHEET:

A cold rolled steel sheet of 0.8 mm×70 mm×150 mm was subjected to a phosphating treatment with Bonderite #3004 (trade name, made by Nippon Parkerizing Co., Ltd.), coated with a cation electropaint of Power Top U-100 (trade name, made by Nippon Paint Co., Ltd.) as an under coat and then dried by baking at 175° C. for 20 minutes. The dried thickness of the resulting electrocoating was 20 μm.

Then, each of the aforementioned primer compositions was applied by an air spray painting process, and thereafter Epico No. 1500 Sealer TM-2 (trade name, made by Nippon Oil and Fats Co., Ltd.) was applied as an amino/oil-free polyester resin series inter coat of a wet-on-wet system by an air spray painting process and dried by baking at 140° C. for 30 minutes. The dried thickness of the primer was 5~8 μm, and that of the inter coat was 30~35 μm.

Next, an amino/alkyd resin series solid color of Melami No. 1500 White (trade name, made by Nippon Oil and Fats Co., Ltd.) was applied as a top coat by an air spray painting process and dried by baking at 140° C. for 30 minutes. The dried thickness of the top coat was 40 μm.

polyphenylene oxide resin (PPO) GTX-910 (trade name, made by Engineering Plastic K.K.)
   (E) Polycarbonate resin sheet (PC) Yubiron MB-2201 (trade name, made by Mitsubishi Gas Chemical Company, Inc.)
   (F) Polypropylene resin sheet (PP) Mitsubishi Noblen BC5D (trade name, made by Mitsubishi Yuka K.K., propylene-ethylene block copolymer)
   (G) Polyurethane resin sheet (PU) C1056/FA720 (trade name, made by Nippon Polyurethane Industry Co., Ltd.)
H. Painting process A plastic sheet having a size of 3 mm×70 mm×150 mm was degreased with a vapor of 1,1,1-trichloroethane (74° C.) for 60 seconds in case of the sheets A~D and F~G and with isopropyl alcohol for 60 seconds in case of the sheet E, dried, coated with the aforementioned primer by an air spray painting process, and then coated with Epico No. 1500 Sealer TM-2 as an, amino-/oil free polyester resin series inter coat of a wet-on-wet system by an air spray painting process, which was then dried by baking at 140° C. for 30 minutes. The dried thickness of the primer was 5~8 μm, and that of the inter coat was 30~35 μm. Thereafter, the amino/alkyd resin paint of Melami No. 1500 White was applied as a top coat by an air spray painting process and dried by baking at 140° C. for 30 minutes. The dried thickness of the top coat was 40 μm.

COMPARATIVE EXAMPLE 6

The same procedure as described in Example 1 was repeated except that the application of the primer composition was omitted.

The following tests were made with respect to the coating on the steel sheet and plastic sheet to obtain results as shown in the following Tables 2 and 3.

TEST AND EVALUATION METHODS:

1. Chipping resistance
Testing machine: gravelometer made by Suga Shikenki K.K.
Testing stone: No. 7 hard pulverized sand (diameter:2~3 mm) 100 g/test
Air pressure blown: 4 kg/cm$^2$
Blowing angle: 9°
Sheet temperature: 20° C.
The test was made under the above conditions to evaluate the peeling state of the coating (CP-I) and the number of rusting points generated (CP-II).
Evaluation standard of CP-I:
Peeling diameter of less than 0.5 mm, ○(excellent)
Peeling diameter of not less than 0.5 mm but less than 1.0 mm, Δ (acceptable)
Peeling diameter of not less than 1.0 mm, x (bad)
The evaluation of CP-II was made by the number of rusting points generated after 72 hours by spraying salt (according to salt spraying test of JIS K-5400, 7.8) to the test sheet.
Rust number of less than 20, ○(excellent)
Rust number of not less than 20 but less than 50, Δ (acceptable)
Rust number of not less than 50, x (bad)
2. Adhesion property (according to JIS K-5400)
Eleven lines were drawn on the test sheet in length and width at intervals of 1 mm by means of a cutter knife to have a depth reaching the sheet material, and then cellophane tapes were adhered to the resulting 100 measures. Thereafter, these tapes were peeled off at once to measure the number of remaining measures for the evaluation of adhesion property. The evaluation standard was ○ (100/100, excellent), Δ (99/100~80/100, good), x (79/100~50/100, bad) and xx (49/100~0/100, considerably bad).
3. Humidity resistance
After the test sheet was placed in a closed box adjusted to a temperature of 50°±1° C. and a relative humidity of not less than 98% for 240 hours, the presence of blisters in the appearance of the coating was observed for the evaluation of humidity resistance. The evaluation standard was ○ (no blistering, excellent) Δ (presence of blisters having a diameter of less than 0.2 mm, acceptable) and x (presence of blisters having a diameter of not less than 0.2 mm, unacceptable).
4. Gasoline resistance
The test sheet was immersed in gasoline for 1 hour to evaluate color change, swelling, peeling and the like of the coating. The evaluation standard was ○(no change; excellent), Δ (slightly change; acceptable) and x (considerably change; bad).
5. Impact resistance at low temperature (High-speed impact test)
A value of impact energy when a point of impact shot through the test sheet was measured by means of a high-speed impact testing machine made by Rheometric Corporation under such conditions that a tip diameter of an impact point was 1.6 cm (5/8 inch), a holder was 5.1 cm (2 inch) and an impact speed was 11.1 m/sec., from which a yield energy value (joules) at −40° C. was calculated.
The larger the numerical value, the better the impact resistance at low temperature.

TABLE 2

| Sheet material | Test items | Example | | | | | | | | | Comparative Example | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| Steel sheet | chipping resistance CP-I | O | O | O | O | O | O | O | O | O | O | Δ | O | X | Δ | X |
| | chipping resistance CP-II | O | O | O | O | O | O | O | O | O | Δ | X | O | X | X | Δ |
| | adhesion property | O | O | O | O | O | O | O | O | O | O | O | Δ | O | O | O |
| | gasoline resistance | O | O | O | O | O | O | O | O | O | O | O | O | O | O | O |
| | humidity resistance | O | O | O | O | O | O | O | O | O | O | Δ | X | O | O | O |

TABLE 3

| Sheet material | Test items | Example | | | | | | | | | Comparative Example | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| PA | chipping resistance CP-I | O | O | O | O | O | O | O | O | O | O | Δ | O | Δ | Δ | X |
| | adhesion property | O | O | O | O | O | O | O | O | O | O | O | X | O | O | Δ |
| | gasoline resistance | O | O | O | O | O | O | O | O | O | O | O | X | O | O | O |
| | impact resistance at low temperature (joule) | 12 | 12 | 13 | 13 | 13 | 10 | 12 | 12 | 12 | 7 | 5 | 13 | 3 | 4 | 2 |
| | humidity resistance | O | O | O | O | O | O | O | O | O | O | Δ | X | O | O | O |
| PBT | chipping resistance CP-I | O | O | O | O | O | O | O | O | O | O | Δ | O | Δ | Δ | X |
| | adhesion property | O | O | O | O | O | O | O | O | O | O | O | X | O | O | Δ |
| | gasoline resistance | O | O | O | O | O | O | O | O | O | O | O | X | O | O | O |
| | impact resistance at low temperature (joule) | 47 | 47 | 48 | 49 | 46 | 42 | 48 | 46 | 45 | 30 | 15 | 49 | 8 | 6 | 3 |
| | humidity resistance | O | O | O | O | O | O | O | O | O | O | Δ | X | O | O | O |
| SMC | chipping resistance CP-I | O | O | O | O | O | O | O | O | O | O | Δ | O | Δ | Δ | X |
| | adhesion property | O | O | O | O | O | O | O | O | O | O | O | X | O | O | X |

TABLE 3-continued

| Sheet material | Test items | Example 1 | 2 | 3 | 4 | 5 | 6 | 7 | 8 | 9 | Comparative Example 1 | 2 | 3 | 4 | 5 | 6 |
|---|---|---|---|---|---|---|---|---|---|---|---|---|---|---|---|---|
| | gasoline resistance | O | O | O | O | O | O | O | O | O | O | O | X | O | O | X |
| | impact resistance at low temperature (joule) | 19 | 18 | 20 | 20 | 20 | 17 | 19 | 17 | 17 | 10 | 6 | 19 | 5 | 4 | 10 |
| PA/PPO | humidity resistance | O | O | O | O | O | O | O | O | O | O | Δ | X | O | O | O |
| | chipping resistance CP-I | O | O | O | O | O | O | O | O | O | O | Δ | O | Δ | Δ | X |
| | adhesion property | O | O | O | O | O | O | O | O | O | O | O | X | O | O | Δ |
| | gasoline resistance | O | O | O | O | O | O | O | O | O | O | O | X | O | O | O |
| | impact resistance at low temperature (joule) | 48 | 48 | 47 | 50 | 50 | 48 | 50 | 44 | 47 | 27 | 16 | 49 | 10 | 11 | 6 |
| PC | humidity resistance | O | O | O | O | O | O | O | O | O | O | Δ | X | O | O | O |
| | chipping resistance CP-I | O | O | O | O | O | O | O | O | O | O | Δ | O | Δ | Δ | X |
| | adhesion property | O | O | O | O | O | O | O | O | O | O | O | X | O | O | O |
| | gasoline resistance | O | O | O | O | O | O | O | O | O | O | O | X | O | O | O |
| | impact resistance at low temperature (joule) | 46 | 48 | 47 | 50 | 50 | 43 | 49 | 47 | 47 | 35 | 20 | 47 | 10 | 7 | 5 |
| PP | humidity resistance | O | O | O | O | O | O | O | O | O | O | Δ | X | O | O | O |
| | chipping resistance CP-I | O | O | O | O | O | O | O | O | O | O | Δ | O | Δ | Δ | X |
| | adhesion property | O | O | O | O | O | O | O | O | O | O | O | X | O | O | X |
| | gasoline resistance | O | O | O | O | O | O | O | O | O | O | O | X | O | O | X |
| | impact resistance at low temperature (joule) | 35 | 36 | 36 | 37 | 35 | 37 | 36 | 39 | 38 | 19 | 13 | 35 | 8 | 11 | 5 |
| PU | humidity resistance | O | O | O | O | O | O | O | O | O | O | Δ | X | O | O | X |
| | chipping resistance CP-I | O | O | O | O | O | O | O | O | O | O | Δ | O | Δ | Δ | X |
| | adhesion property | O | O | O | O | O | O | O | O | O | O | O | X | O | O | X |
| | gasoline resistance | O | O | O | O | O | O | O | O | O | O | O | X | O | O | X |
| | impact resistance at low temperature (joule) | 35 | 36 | 36 | 37 | 35 | 37 | 36 | 39 | 38 | 18 | 13 | 30 | 7 | 11 | 5 |
| | humidity resistance | O | O | O | O | O | O | O | O | O | O | Δ | X | O | O | X |

As seen from the results of Tables 2 and 3, the use of the primer composition according to the invention is excellent in the chipping resistance, adhesion property, humidity resistance and gasoline resistance for the steel sheet and excellent in the chipping resistance, adhesion property, humidity resistance, gasoline resistance and impact resistance at low temperature for all plastic sheets, so that it can ensure the good balance of total film performances required as a paint for automobiles.

On the contrary, Comparative Example 1 is poor in the chipping resistance for the steel sheet and in the impact resistance at low temperature for all plastic sheets because the grafting ratio of ε-caprolactone ring-opened polymer is less than 0.5%.

In Comparative Example 2, though the resin composition is the same as in Example 1, the ratio P/B exceeds 2.0 due to the excess addition of pigment, so that the chipping resistance and humidity resistance are poor for the steel sheet, and the chipping resistance, impact resistance at low temperature and humidity resistance are poor for all plastic sheets.

In Comparative Example 3, since the grafting ratio of ε-caprolactone ring-opened polymer exceeds 50%, the adhesion property and humidity resistance are poor for the steel sheet, and the adhesion property, gasoline resistance and humidity resistance are poor for all plastic sheets.

In Comparative Example 4 wherein the solid content of resin and crosslinking agent in the primer exceeds 30%, or Comparative Example 5 wherein the solid content of cross-linking agent in the primer exceeds 30%, the chipping resistance for the steel sheet is poor, and the chipping resistance and impact resistance at low temperature are poor for all plastic sheets.

In Comparative Example 6, since the primer composition according to the invention is not used, the chipping resistance for the steel sheet is poor, while the chipping resistance, adhesion property and impact resistance at low temperature for PA, PBT and PA/PPO sheets, the chipping resistance, adhesion property, gasoline resistance and impact resistance at low temperature for SMC sheet, the chipping resistance and impact resistance at low temperature for PC sheet, and the chipping resistance, adhesion property, gasoline resistance, impact resistance at low temperature and humidity resistance for PP and PU sheets are poor.

What is claimed is:

1. A primer composition consisting essentially of a polycaprolactone graft copolymer having a primary hydroxyl group, said copolymer being obtained by graft-polymerizing a styrenebutadiene-styrene block copolymer or it hydrogenated copolymer with a ring opened polymer of ε-caprolactone and a hydroxyl group-containing acrylic or methacrylic ester, said composition having a grafting ratio of said ring opened polymer within the range of 0.5–50% by weight.

2. A primer composition consisting essentially of polycaprolactone graft polymer having primary hydroxyl group, said copolymer being obtained by graft-polymerizing a styrenebutadiene-styrene block copolymer or its hydrogenated polymer with a hydroxyl group-containing acrylic or methacrylic ester, and then ring opening polymerization with a polymer of an ε-caprolactone, said composition having a grafting ratio of said ring opened polymer within the range of 0.5–50% by weight.

* * * * *